United States Patent
Drake et al.

(10) Patent No.: US 12,435,241 B2
(45) Date of Patent: Oct. 7, 2025

(54) SYSTEMS AND METHODS FOR IMPROVED MATERIAL SAMPLE ANALYSIS AND QUALITY CONTROL

(71) Applicants: LONGYEAR TM, INC., Salt Lake City, UT (US); DECISION TREE, LLC, Greeley, CO (US)

(72) Inventors: Brandon Lee Goodchild Drake, Greeley, CO (US); Ry Nathaniel Zawadzki, Belmont (AU)

(73) Assignees: DECISION TREE, LLC, Greeley, CO (US); VERACIO, LTD., Salt Lake City, UT (US)

( * ) Notice: Subject to any disclaimer, the term of this patent is extended or adjusted under 35 U.S.C. 154(b) by 0 days.

(21) Appl. No.: 18/036,096

(22) PCT Filed: Nov. 11, 2021

(86) PCT No.: PCT/US2021/058966
§ 371 (c)(1),
(2) Date: May 9, 2023

(87) PCT Pub. No.: WO2022/103952
PCT Pub. Date: May 19, 2022

(65) Prior Publication Data
US 2025/0271369 A1    Aug. 28, 2025

Related U.S. Application Data

(60) Provisional application No. 63/112,518, filed on Nov. 11, 2020.

(51) Int. Cl.
*G01N 23/223* (2006.01)
*G01N 33/24* (2006.01)

(52) U.S. Cl.
CPC ........... *G01N 23/223* (2013.01); *G01N 33/24* (2013.01); *G01N 2223/076* (2013.01); *G01N 2223/616* (2013.01)

(58) Field of Classification Search
CPC ................. G01N 23/223; G01N 33/24; G01N 2223/076; G01N 2223/616
See application file for complete search history.

(56) References Cited

U.S. PATENT DOCUMENTS

| 7,796,726 B1 | 9/2010 | Gendreau et al. |
| 9,448,191 B2 | 9/2016 | Utaka et al. |
| (Continued) | | |

FOREIGN PATENT DOCUMENTS

| CN | 107894434 A | * | 4/2018 | |
| JP | 2014035334 A | * | 2/2014 | ............ G01N 23/06 |
| WO | 2020072930 A1 | | 4/2020 | |

OTHER PUBLICATIONS

Henrique et al., "Multiple linear regression and random forest to predict and map soil properties using data from portable X-ray fluorescence spectrometer," Ciencia E Agrotecnologia, 2017 pp. 648-664, vol. 41, No. 6.

(Continued)

*Primary Examiner* — Kiho Kim
(74) *Attorney, Agent, or Firm* — Ballard Spahr LLP

(57) ABSTRACT

Provided herein are methods and systems for improved material sample analysis and quality control. A computing device may receive sample data associated with a plurality of material samples. The computing device may determine a first subset of the plurality of material samples and a second subset of the plurality of material samples. The computing device may determine the first subset based on a plurality of reference values and a plurality of analysis thresholds. The first subset may include samples associated with acceptable XRF spectra. The second subset may (Continued)

include samples associated with unacceptable XRF spectra. The computing device may generate and manipulate charts, graphs, or other visual displays of the data underlying the first subset and/or the second subset.

20 Claims, 10 Drawing Sheets

(56) References Cited

U.S. PATENT DOCUMENTS

| | | |
|---|---|---|
| 2018/0243800 A1 | 8/2018 | Kumar et al. |
| 2020/0070711 A1 | 3/2020 | Kanck et al. |
| 2020/0155088 A1 | 5/2020 | Gruener et al. |

OTHER PUBLICATIONS

Extended European Search Report issued in related application No. EP21892803.4 dated Sep. 5, 2024.
Tiwari et al. "Sample Preparation for Evaluation of Detection Limits in X-ray Fluorescence Spectrometry", Analytical Sciences Feb. 2005. Retrieved on Apr. 1, 2022, from <URL: <https://www.jstage.jst.go.jp/article/analsci/21/2/21_2_143/_pdf>.
International Search Report and Written Opinion issued in related application No. PCT/US2021/058966 mailed on Jan. 31, 2022.

* cited by examiner

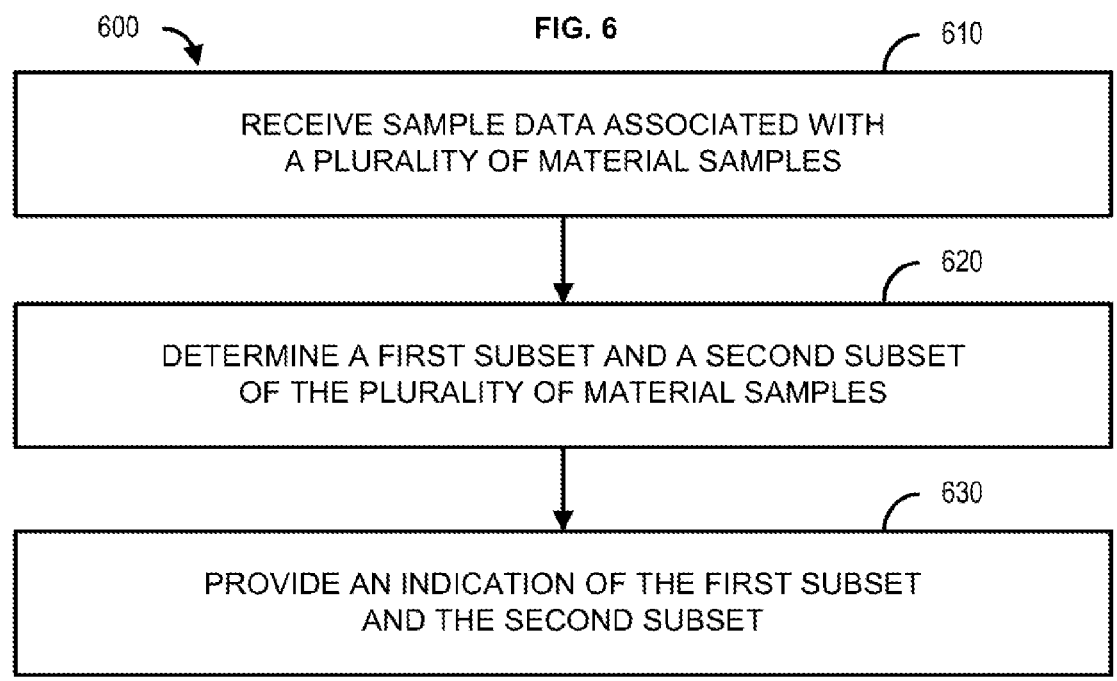

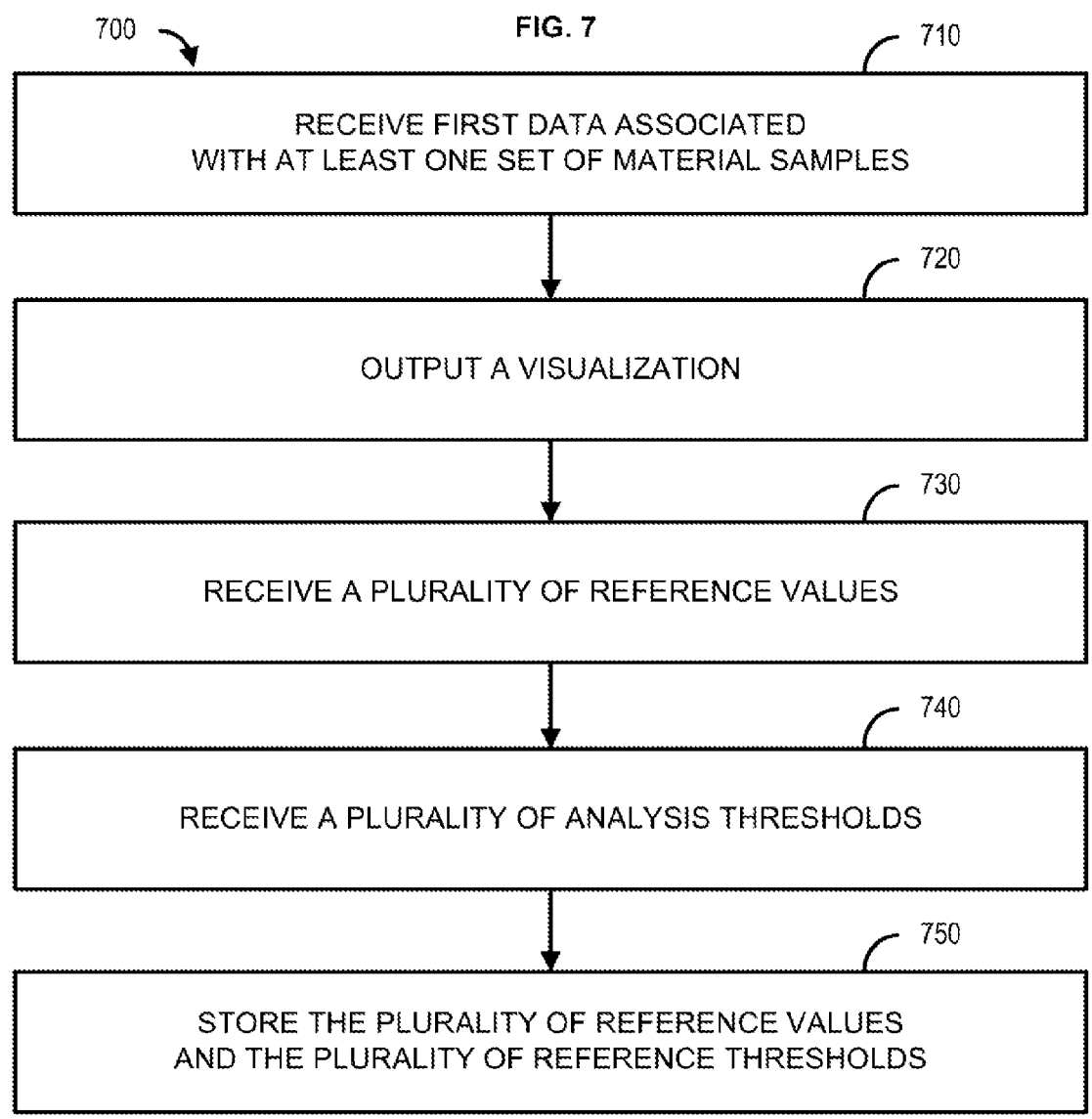

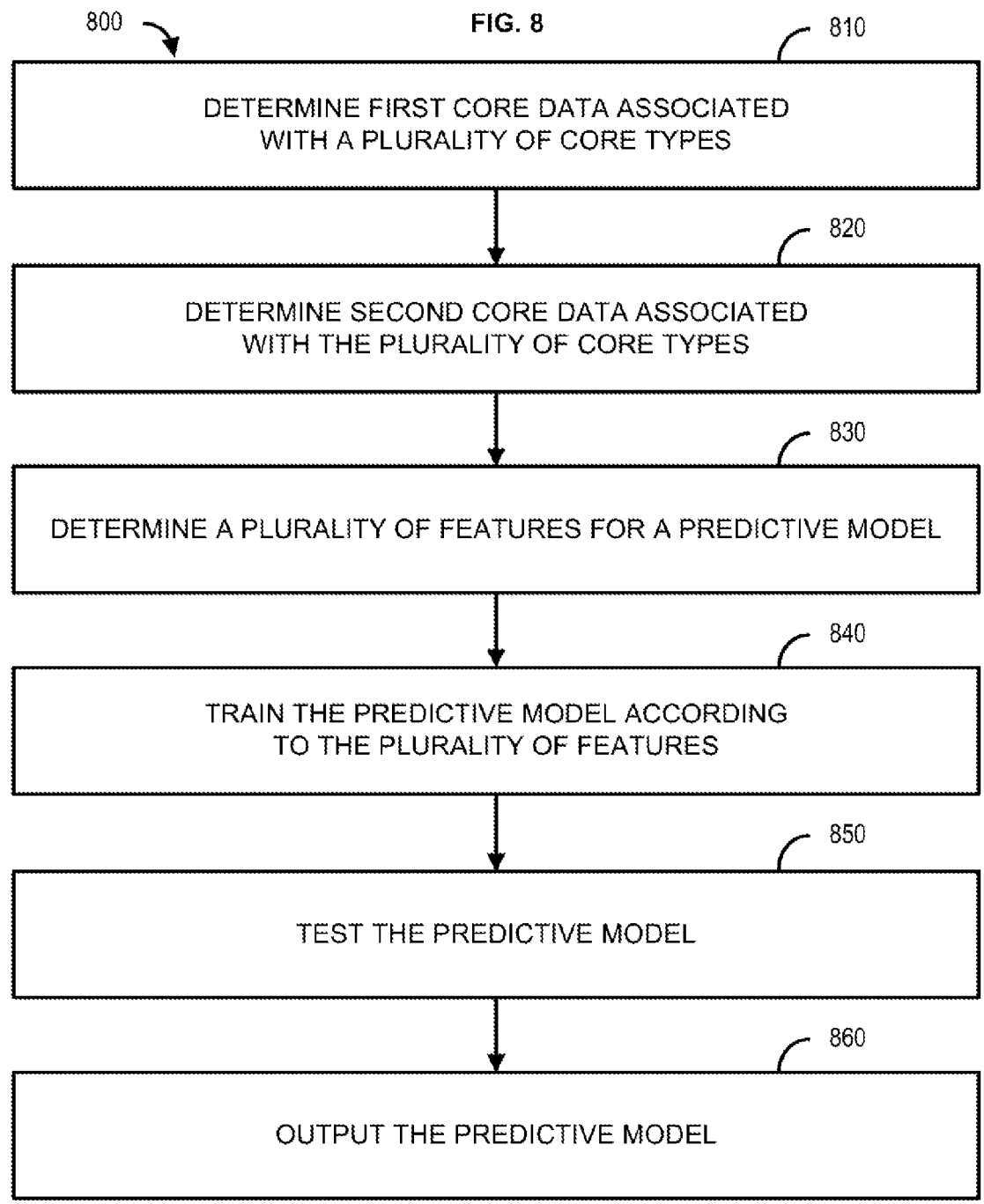

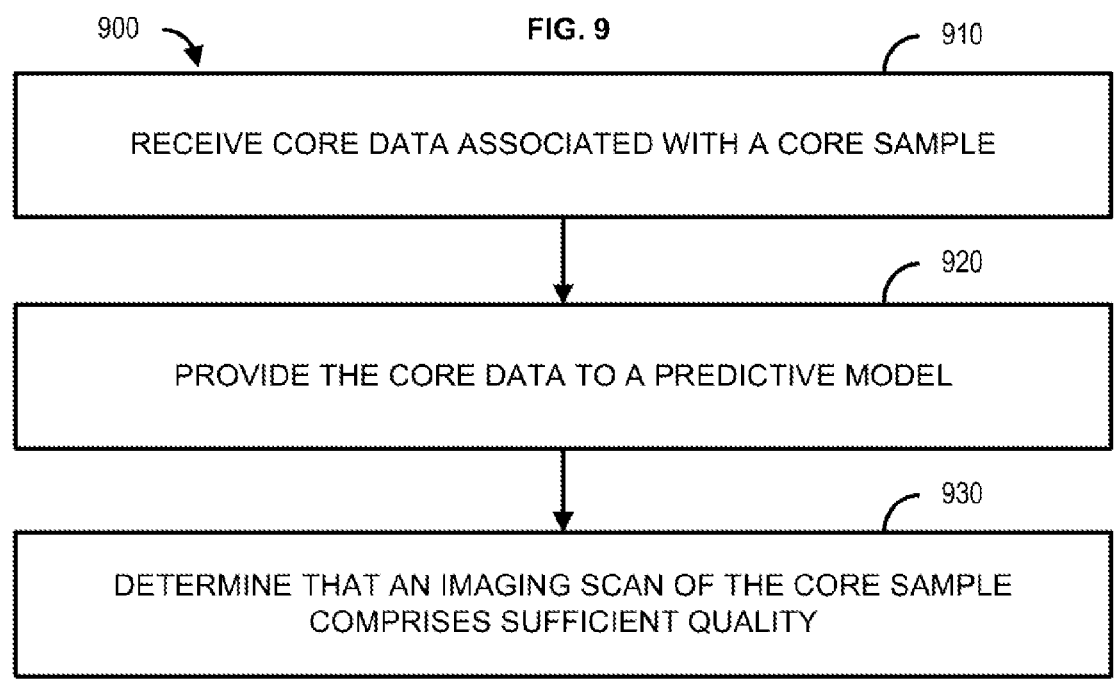

SYSTEMS AND METHODS FOR IMPROVED MATERIAL SAMPLE ANALYSIS AND QUALITY CONTROL

CROSS REFERENCE TO RELATED PATENT APPLICATIONS

This application is a U.S. National Stage Application of International Patent Application No. PCT/US2021/058966, filed on Nov. 11, 2021, which claims priority to U.S. Provisional Application No. 63/112,518, which was filed on Nov. 11, 2020, the entirety of which is incorporated by reference herein.

BACKGROUND

Typically, quality control of extracted material samples requires shipping of the samples to a distant laboratory, where the samples are analyzed in a controlled environment by specially trained personnel. This analysis process is frequently associated with lengthy sample transport times, delays caused by limited access to the laboratory or limited trained personnel, and/or delays caused by detailed analysis and reporting. Additionally, existing quality control systems typically require extensive user training and certification before the systems can be used. These and other considerations are discussed herein.

SUMMARY

It is to be understood that both the following general description and the following detailed description are exemplary and explanatory only and are not restrictive. Provided herein are methods and systems for improved material sample analysis and quality control. As an example, it is an object of the presently described invention to provide computer-implemented systems and methods for quality control that improve analysis of material samples, such as core samples, rock samples, chip samples, solid puck samples, etc. For example, a computing device may receive sample data associated with a plurality of material samples. The sample data may be x-ray fluorescence (XRF) spectra data associated with the plurality of material samples. XRF spectra data for a sample may indicate one or more properties associated with the sample, such as one or elements present with the sample. The computing device may determine a first subset of the plurality of material samples and a second subset of the plurality of material samples.

For example, the computing device may determine the first subset based on a plurality of reference values and a plurality of analysis thresholds. The first subset may include samples associated with acceptable XRF spectra. As another example, the computing device may determine the second subset based on the plurality of reference values and the plurality of analysis thresholds. The second subset may include samples associated with unacceptable XRF spectra. The computing device may include a user interface. The user interface may be used to review and analyze data underlying the first subset and/or the second subset. For example, the user interface may be used to generate and manipulate charts, graphs, or other visual displays of the data underlying the first subset and/or the second subset. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 6 shows a flowchart for an example method;
FIG. 7 shows a flowchart for an example method;
FIG. 8 shows a flowchart for an example method;
and
FIG. 9 shows a flowchart for an example method.

DETAILED DESCRIPTION

Figure 1:
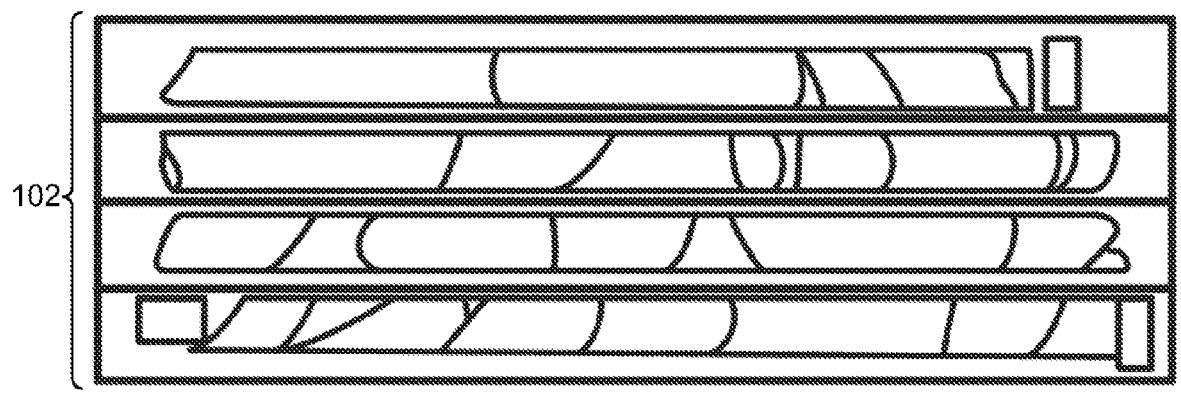
FIG. 1 shows an example material sample.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved material sample analysis and quality control. As an example, it is an object of the presently described invention to provide computer-implemented systems and methods for quality control that improve analysis of material samples, such as core samples, rock samples, chip samples, solid puck samples, etc. For example, a computing device may receive sample data associated with a plurality of material samples. The sample data may be X-ray fluorescence (XRF) spectra data associated with the plurality of material samples. XRF spectra data for a sample may indicate one or more properties associated with the sample, such as one or elements present with the sample. The computing device may determine a first subset of the plurality of material samples and a second subset of the plurality of material samples.

For example, the computing device may determine the first subset based on a plurality of reference values and a plurality of analysis thresholds. The first subset may include samples associated with acceptable XRF spectra. As another example, the computing device may determine the second subset based on the plurality of reference values and the plurality of analysis thresholds. The second subset may include samples associated with unacceptable XRF spectra.

The plurality of reference values and the plurality of analysis thresholds may be associated with at least one sample of the plurality of material samples. Each reference value of the plurality of reference values may include a range of energy levels and a range of counts-per-second associated with a property of the one or more properties. The plurality of analysis thresholds may include one or more of a match percentage threshold, a property-specific threshold, a signal-to-noise threshold, or a counts-per-second threshold.

The match percentage threshold may be based on the plurality of reference values. For example, match percentage threshold may define what percent of an XRF spectrum fits within the plurality of reference values. The property-specific threshold may be a percentage of Argon present within the at least one sample or a percentage of an anode material reflectance present within the at least one sample. The signal-to-noise ratio may be a ratio of variance to central tendency which reflects an amount of noise of a given measurement, which may be used to exclude samples associated with less reliable signal for identified features. The counts-per-second threshold may include a percentile value. For example, the counts-per-second threshold may be used to exclude samples associated with a spectrum having counts-per-second that fall below the selected percentile value.

The computing device may include a user interface. The user interface may be used to review and analyze data underlying the first subset and/or the second subset. For example, the user interface may be used to generate and manipulate charts, graphs, or other visual displays of the data underlying the first subset and/or the second subset. The user interface may also allow a user to manipulate the plurality of reference values and/or the plurality of analysis thresholds. The user interface may provide updated charts, graphs, or other visual displays of the data underlying the first subset and/or the second subset based on the user's manipulation (e.g., adjustment) of the plurality of reference values and/or the plurality of analysis thresholds.

As another example, a predictive model may be generated by a computing device using machine learning techniques and algorithms. The predictive model may be used to determine whether an imaging result of a material sample is of sufficient quality to indicate a composition of the material sample, such as rock and/or mineral types present therein. To generate the predictive model, the computing device may analyze first sample data and second sample data associated with a plurality of core types (e.g., composition types). The first sample data and the second sample data may include a plurality of imaging results, such as results of x-ray fluorescence (XRF) scans, associated with the plurality of core types. The second sample data may include imaging results that are labeled as either having sufficient quality or insufficient quality (e.g., sufficient or insufficient imaging quality). Using the first sample data and the second sample data, the computing device may extract a number of features from the plurality of imaging results. The extracted features may include a level of intensity of an XRF spectrum peak, a level of energy of an XRF spectrum peak, an indication of a concentration of an element, an indication of a presence of an element, a combination thereof, and/or the like.

As the second sample data may include imaging results labeled as either having sufficient quality or insufficient quality, the extracted imaging features and a first portion of the second sample data may be used by the computing device to train the predictive model. Once trained, the computing device may test the predictive model using a second portion of the second sample data to determine whether the predictive model accurately labels imaging results within the second portion of the second sample data as having sufficient quality or insufficient quality. After being tested, the computing device may output the predictive model (e.g., store the predictive model) or provide the predictive model to a second computing device.

Another computing device (e.g., present at an excavation site), or the same computing device that generated and trained the predictive model, may use the predictive model to analyze new sample data associated with a new material sample. The new sample data may include an imaging result, such as a result of an XRF scan, of the new material sample. The new sample data may be provided to the predictive model (e.g., as input data). Using the predictive model, it may be determined whether the imaging result of the new material sample is of sufficient or insufficient quality to indicate a composition of the new material sample, such as rock and/or mineral types present therein.

Turning now to FIG. 1, an example material sample 102 is shown. The material sample 102 may be collected and analyzed by an x-ray fluorescence (XRF) system, an infrared system, an ultraviolet light system, and/or the like. For the purposes of describing the present methods and systems, and XRF system will be referred to herein. However, it is to be understood that other imaging modalities may be used as can be appreciated by those having skill in the art.

The XRF system may scan drilled/extracted material samples to provide meaningful data, which may be used to interpret a region of drilling for additional drill targets. For example, the XRF system may be configured to deliver radiation to the material sample 102 positioned within a sample analysis area and to detect XRF in response to the radiation delivered to the material sample 102. As an example, the XRF system may deliver radiation to the material sample 102 at a voltage range of between 0 and 50 keV. The XRF system may provide a result of the imaging scan of the material sample 102 (an "imaging result") to a computing device, as described herein. The computing device may use the imaging result of the material sample 102 to determine a composition of the material sample 102, such as rock and/or mineral types present therein.

Figure 2A:
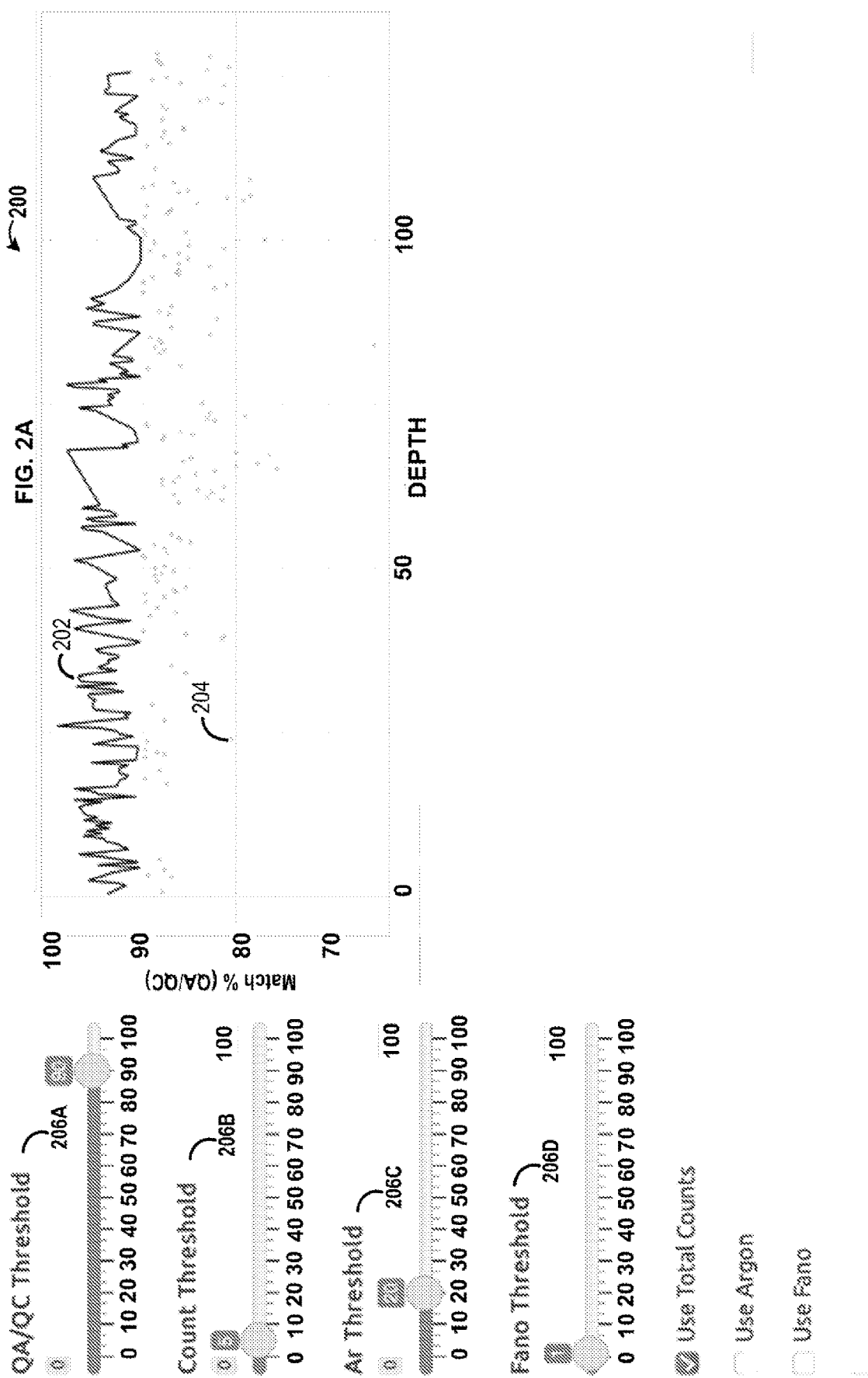
FIGS. 2A-2D show example user interfaces.

Turning now to FIG. 2A, an example user interface 200 is shown. As discussed herein, the user interface may be used to generate and manipulate charts, graphs, or other visual displays of the data underlying a first subset and/or a second subset of samples. As shown in FIG. 2A, the user interface 200 may show a first subset of samples 202 associated with XRF spectra that satisfy a plurality of analysis thresholds that are based on a plurality of reference values. Each reference value of the plurality of reference values may include a range of energy levels and a range of counts-per-second associated with a property of the one or more properties. The plurality of analysis thresholds may include a match percentage threshold (e.g., a QA/QC value) 206A, a count threshold (e.g., a counts-per-second threshold) 206B, a property-specific threshold (e.g., an Argon threshold) 206C, and a signal-to-noise threshold (e.g. a Fano factor) 206D. The user interface 200 may show a second subset of samples 204 that do not satisfy the plurality of reference values and a plurality of analysis thresholds.

In the example shown in FIG. 2A, the user interface 200 indicates that the first subset of samples 202 satisfy the match percentage threshold 206A, the count threshold 206B, the property-specific threshold 206C, and the signal-to-noise threshold 206D. The second subset of samples 204, on the other hand, do not satisfy one or more of the match percentage threshold 206A, the count threshold 206B, or the property-specific threshold 206C. As shown in FIG. 2A, a user of the user interface 200 may manipulate (e.g., adjust) one or more of the match percentage threshold 206A, the count threshold 206B, or the property-specific threshold 206C. An adjustment to any of the thresholds may affect which samples are shown in the first subset of samples 202 and the second subset of samples 204. If an adjustment of the match percentage threshold 206A yields a low amount of results shown within the first subset of samples 202, then the calibration/reference value for the match percentage threshold 206A may need to be adjusted, since the calibration/reference value for the match percentage threshold 206A defines the "entire world" in which the system can identify elements/properties within samples. As another example, the counts-per-second threshold 206B may be used to exclude samples associated with a spectrum having counts-per-second that fall below a selected percentile value. The counts-per-second threshold 206B may need to be adjusted when it's discovered that an XRF sensor is too close or too far from a sample.

Figure 2B:
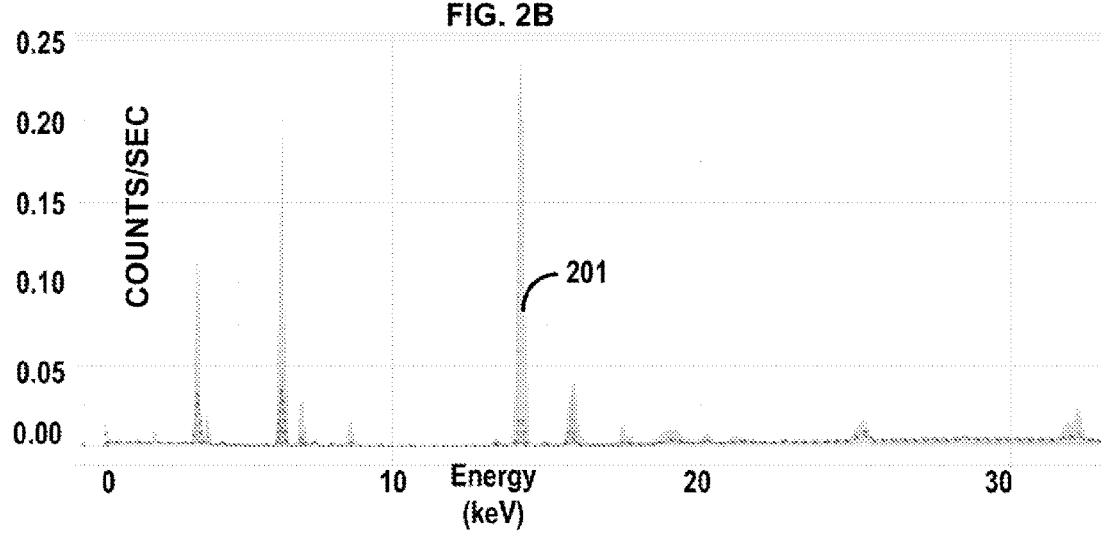

FIG. 2B shows an example graph of an XRF energy spectrum. As shown in FIG. 2B, the XRF energy spectrum may be visualized as a spectrum graph, where the x-axis represents material-specific fluorescent energies at a range of voltages (e.g., between 0 and 30 keV), and the y-axis represents counts or pulses per second. The XRF energy spectrum may indicate a number of counts of material-specific fluorescent x-ray energies received by the XRF system. The XRF energy spectrum may be representative of an imaging result of the material sample 102 shown in FIG. 1. For example, the XRF energy spectrum may result from the XRF system delivering radiation to the material sample 102.

The XRF energy spectrum shown in FIG. 2B may be indicative of a composition of the material sample 102, such as rock and/or mineral types present therein. The XRF energy spectrum shown in FIG. 2B may include a plurality of energy peaks for specific rock and/or mineral types where element-specific fluorescent energies were detected. The higher the peak, the more counts of that particular energy were detected (e.g., the greater the intensity). For example, the intensity of the peak 201 in the XRF energy spectrum shown in FIG. 2B may indicate the material sample 102 consists of a certain amount of a given element or material, such as Nickel, Iron, Manganese, etc. In other words, the intensity of the peak 201 may indicate a relative concentration of an element or material in the material sample 102. As the peak 201 is higher than other peaks in the XRF energy spectrum shown in FIG. 2B (e.g., more counts of that particular energy were detected), it may be determined that the material sample 102 contains a higher concentration of the particular material or element as compared to other elements and/or materials present therein. As further described herein, XRF energy spectra associated with imaging results of material samples may be used to train a predictive model.

Figure 2C:
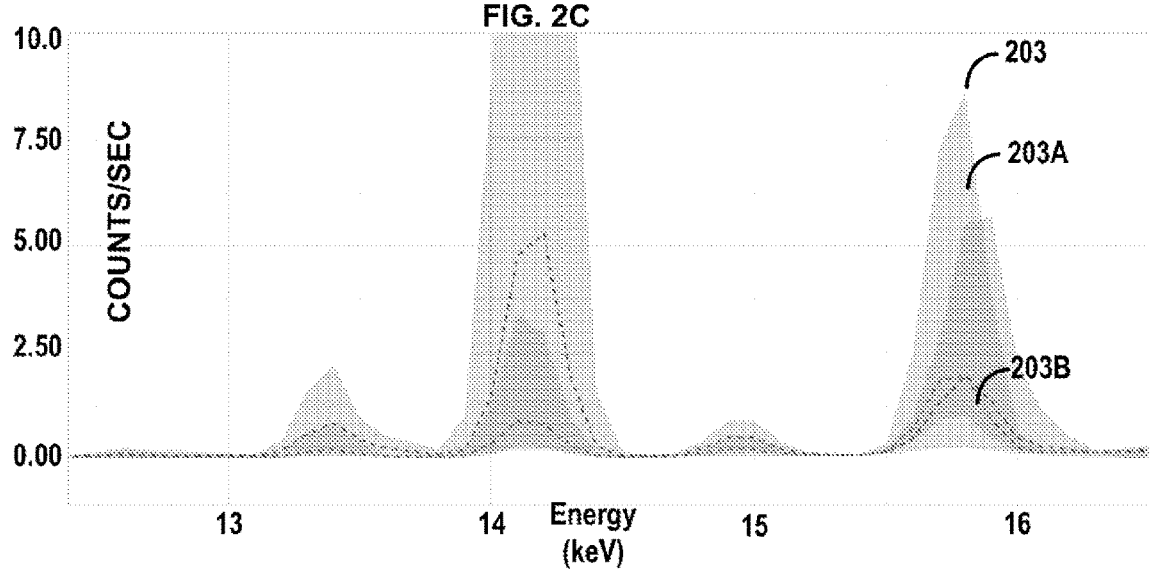

FIG. 2C shows a cropped view of the XRF energy spectrum shown in FIG. 2B. As shown in FIG. 2C, a peak 203 may include an upper section 203A and a lower section 203B. The lower section 203B may represent counts-per-second for one or more samples of the first subset that fall within a calibration/reference range indicated by the count threshold 206B. The upper section 203A may represents counts-per-second for one or more samples of the second subset that fall outside of the calibration/reference range indicated by the count threshold 206B.

Figure 2D:
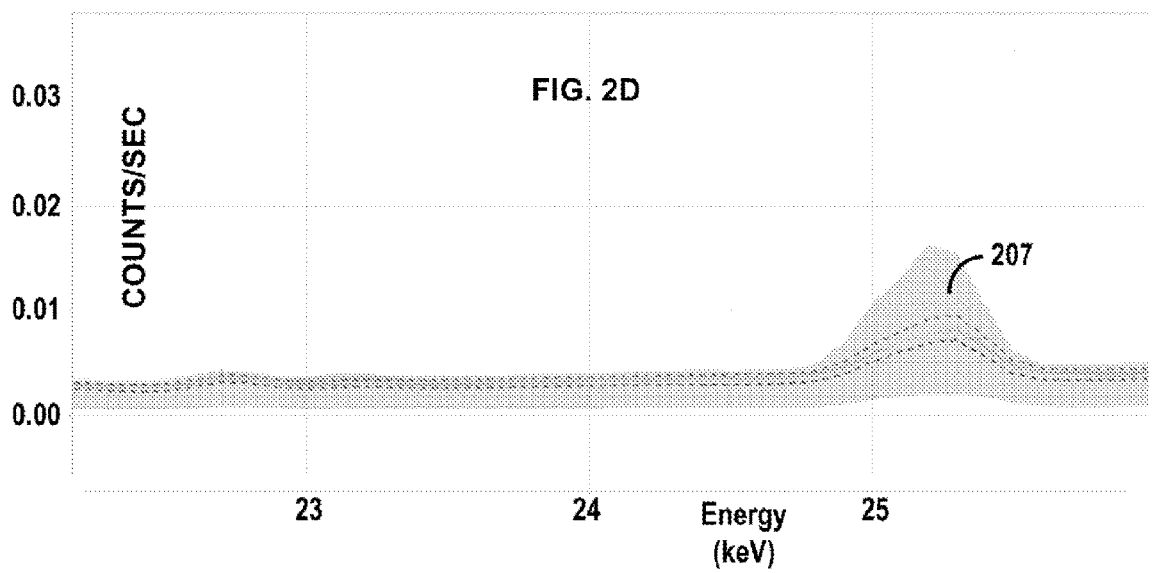

FIG. 2D shows another cropped view of the XRF energy spectrum shown in FIG. 2B. As discussed above, the plurality of analysis thresholds may include the property-specific threshold 206C. The property-specific threshold 206C may be, for example, a threshold level of Argon that is present within a sample. Argon can be used as a proxy for an amount of an "air gap" between an XRF sensor and a particular sample. In this way, the property-specific threshold 206C may be used to remove sample data from consideration when the air gap is too big to provide useful data. Additionally, as discussed above, the plurality of analysis thresholds may include the signal-to-noise threshold 206D. The signal-to-noise threshold 206D may be, for example, a calculation of a variance of the spectrum normalized to an average value of a group of spectra. Measuring noise of the spectrum may be indicative of an expected accuracy for a prediction(s) derived from the spectrum. In this way, the signal-to-noise threshold 206D may be used to remove sample data from consideration when the spectrum is too noisy to provide useful data.

As discussed herein, a predictive model may be generated by a computing device using machine learning techniques and algorithms. The predictive model may be used to determine whether an imaging result of a material sample is of sufficient quality to indicate a composition of the material sample, such as rock and/or mineral types present therein. The predictive model may be a result of applying one or more machine learning models and/or algorithms to sample data associated with a plurality of core types. Machine learning is a subfield of computer science that gives computers the ability to learn without being explicitly programmed. Machine learning platforms include, but are not limited to, naïve Bayes classifiers, support vector machines, decision trees, neural networks, and the like.

For example, a computing device may be used to receive and analyze sample data associated with a plurality of core types using one or more machine learning models and/or algorithms. The sample data may include a number of imaging results associated with a plurality of material samples, each imaging result having one or more features for a particular material sample. The sample data may include a first portion ("first sample data") and a second portion ("second sample data"). The second sample data may include imaging results that are labeled as either having sufficient quality or insufficient quality (e.g., sufficient or insufficient imaging quality). The computing device may utilize the one or more machine learning models and/or algorithms to determine which of the one or more features of the sample data are most closely associated with an image result having sufficient quality versus insufficient quality (or vice-versa). Using those closely associated features, the computing device may generate a predictive model. The predictive model (e.g., a machine learning classifier) may be generated to classify an imaging result of a new material sample as having sufficient quality or insufficient quality based on analyzing the imaging result of the new material sample.

Figure 3:
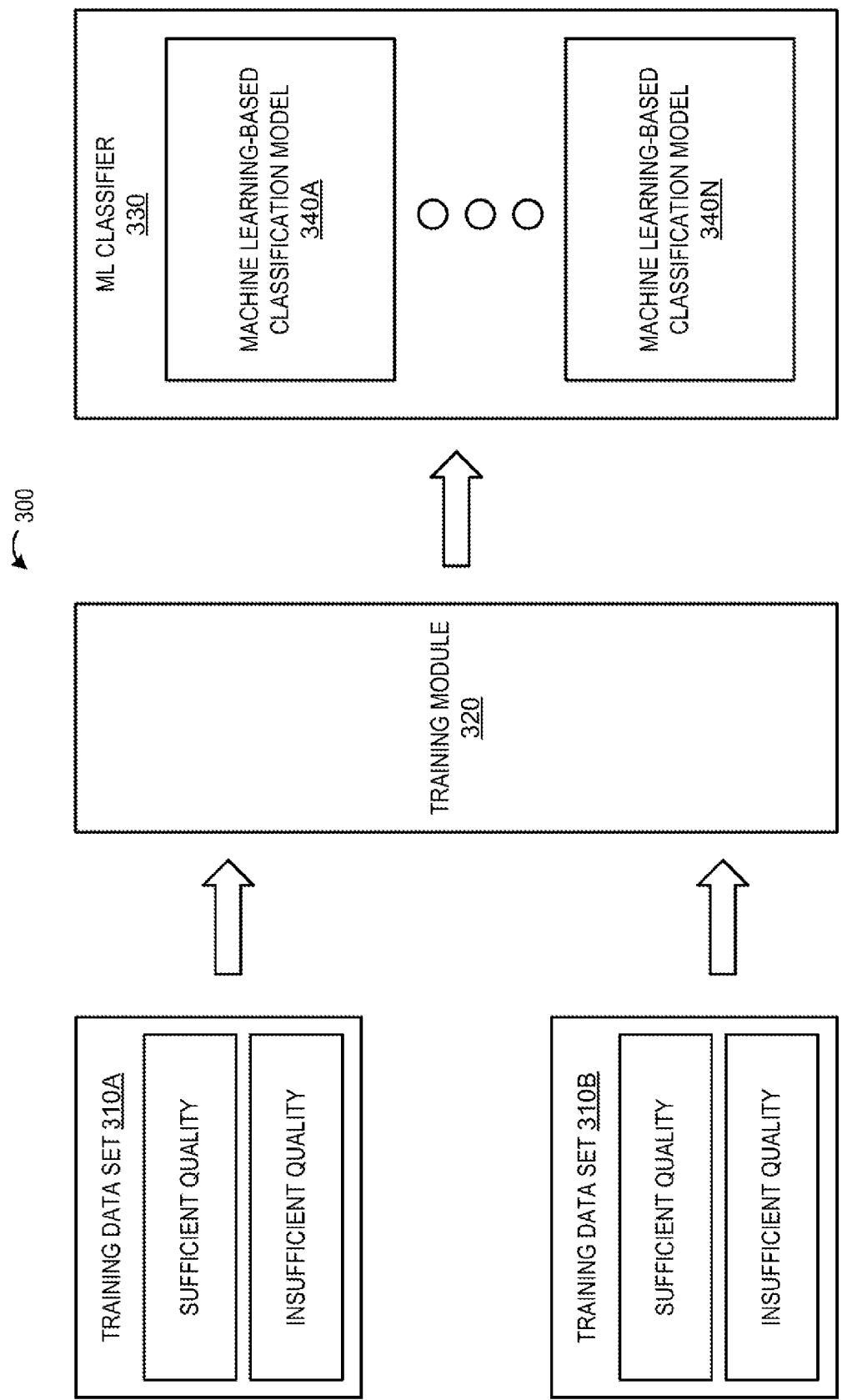
FIG. 3 shows an example machine learning system.

Turning now to FIG. 3, a system 300 is shown. The system 300 may be configured to use machine learning techniques to train, based on an analysis of one or more training data sets 310A-310B by a training module 320, at least one machine learning-based classifier 330 that is configured to classify an imaging result of a new material sample as having sufficient quality or insufficient quality. The training data set 310A (e.g., a first portion of the second sample data) may comprise labeled imaging results (e.g., labeled as being sufficient quality and/or insufficient quality). The training data set 310B (e.g., a second portion of the second sample data) may also comprise labeled imaging results (e.g., labeled as being sufficient quality and/or insufficient quality). The labels may comprise sufficient quality and insufficient quality.

The second portion of the second sample data may be randomly assigned to the training data set 310B or to a testing data set. In some implementations, the assignment of data to a training data set or a testing data set may not be completely random. In this case, one or more criteria may be used during the assignment, such as ensuring that similar numbers of material samples with different labels are in each of the training and testing data sets. In general, any suitable method may be used to assign the data to the training or testing data sets, while ensuring that the distributions of sufficient quality and insufficient quality labels are somewhat similar in the training data set and the testing data set.

The training module 320 may train the machine learning-based classifier 330 by extracting a feature set from the first portion of the second sample data in the training data set 310A according to one or more feature selection techniques. The training module 320 may further define the feature set obtained from the training data set 310A by applying one or more feature selection techniques to the second portion of the second sample data in the training data set 310B that includes statistically significant features of positive examples (e.g., associated with sufficient quality) and statistically significant features of negative examples (e.g., associated with insufficient quality).

The training module 320 may extract a feature set from the training data set 310A and/or the training data set 310B in a variety of ways. The training module 320 may perform feature extraction multiple times, each time using a different feature-extraction technique. In an embodiment, the feature sets generated using the different techniques may each be used to generate different machine learning-based classification models 340. For example, the feature set with the highest quality metrics may be selected for use in training. The training module 320 may use the feature set(s) to build one or more machine learning-based classification models 340A-340N that are configured to indicate whether or not imaging results for new material samples are associated with a sufficient quality or an insufficient quality.

The training data set 310A and/or the training data set 310B may be analyzed to determine any dependencies, associations, and/or correlations between extracted features and the sufficient quality/insufficient quality labels in the training data set 310A and/or the training data set 310B. The identified correlations may have the form of a list of features that are associated with different sufficient quality/insufficient quality labels. The features may be considered as variables in the machine learning context. The term "feature," as used herein, may refer to any characteristic of an item of data that may be used to determine whether the item of data falls within one or more specific categories. By way of example, the features described herein may comprise one or more imaging result attributes. The one or more imaging result attributes may include a level of intensity of an XRF spectrum peak, a level of energy of an XRF spectrum peak, an indication of a concentration of an element, an indication of a presence of an element, a combination thereof, and/or the like.

A feature selection technique may comprise one or more feature selection rules. The one or more feature selection rules may comprise an imaging result attribute occurrence rule. The imaging result attribute occurrence rule may comprise determining which imaging result attributes in the training data set 310A occur over a threshold number of times and identifying those imaging result attribute that satisfy the threshold as candidate features. For example, any imaging result attributes that appear greater than or equal to 3 times in the training data set 310A may be considered as candidate features. Any imaging result attributes appearing less than 3 times may be excluded from consideration as a feature. Any threshold amount may be used as needed.

A single feature selection rule may be applied to select features or multiple feature selection rules may be applied to select features. The feature selection rules may be applied in a cascading fashion, with the feature selection rules being applied in a specific order and applied to the results of the previous rule. For example, the imaging result attribute occurrence rule may be applied to the training data set 310A to generate a first list of imaging result attributes. A final list of candidate features may be analyzed according to additional feature selection techniques to determine one or more candidate groups (e.g., groups of imaging result attributes that may be used to predict whether an imaging result of a new material sample comprises sufficient quality or insufficient quality). Any suitable computational technique may be used to identify the candidate feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., sufficient quality vs. insufficient quality).

As another example, one or more candidate feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. In an embodiment, forward feature selection may be used to identify one or more candidate feature groups. Forward feature selection is an iterative method that begins with no features in the machine learning model. In each iteration, the feature which best improves the model is added until an addition of a new feature does not improve the performance of the machine learning model. In an embodiment, backward elimination may be used to identify one or more candidate feature groups. Backward elimination is an iterative method that begins with all features in the machine learning model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 320 has generated a feature set(s), the training module 320 may generate a machine learning-based classification model 340 based on the feature set(s). A machine learning-based classification model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

The training module 320 may use the feature sets extracted from the training data set 310A and/or the training data set 310B to build a machine learning-based classification model 340A-340N for each classification category (e.g., sufficient quality, insufficient quality). In some examples, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340.

The extracted features (e.g., one or more imaging result attributes) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping for each candidate imaging result attribute to assign an imaging result to a class (e.g., sufficient quality vs. insufficient quality).

The candidate imaging result attributes and the machine learning-based classifier 330 may be used to predict a label (e.g., sufficient quality vs. insufficient quality) for imaging results in the testing data set (e.g., in the second portion of the second sample data). In one example, the prediction for each imaging result in the testing data set includes a confidence level that corresponds to a likelihood or a probability that the corresponding imaging result belongs in the predicted sufficient quality/insufficient quality status. The confidence level may be a value between zero and one, and it may represent a likelihood that the corresponding imaging result belongs to a sufficient quality/insufficient quality status. In one example, when there are two statuses (e.g., sufficient quality and insufficient quality), the confidence level may correspond to a value p, which refers to a likelihood that a particular imaging result belongs to the first status (e.g., sufficient quality). In this case, the value 1-p may refer to a likelihood that the particular imaging result belongs to the second status (e.g., insufficient quality). In general, multiple confidence levels may be provided for each imaging result and for each candidate imaging result attribute when there are more than two statuses. A top performing candidate imaging result attribute may be determined by comparing the result obtained for each imaging result with the known sufficient quality/insufficient quality status for each imaging result in the testing data set (e.g., by comparing the result obtained for each imaging result with the labeled material samples of the second portion of the second sample data). In general, the top performing candidate imaging result attribute will have results that closely match the known sufficient quality/insufficient quality statuses.

The top performing imaging result attribute may be used to predict the sufficient quality/insufficient quality status of an imaging result of a new material sample. For example, new sample data associated with an imaging result of a new material sample may be determined/received. The new sample data may be provided to the machine learning-based classifier 330 which may, based on the top performing candidate imaging result attribute, classify the imaging result of the new material sample as having sufficient quality or as having insufficient quality.

Figure 4:
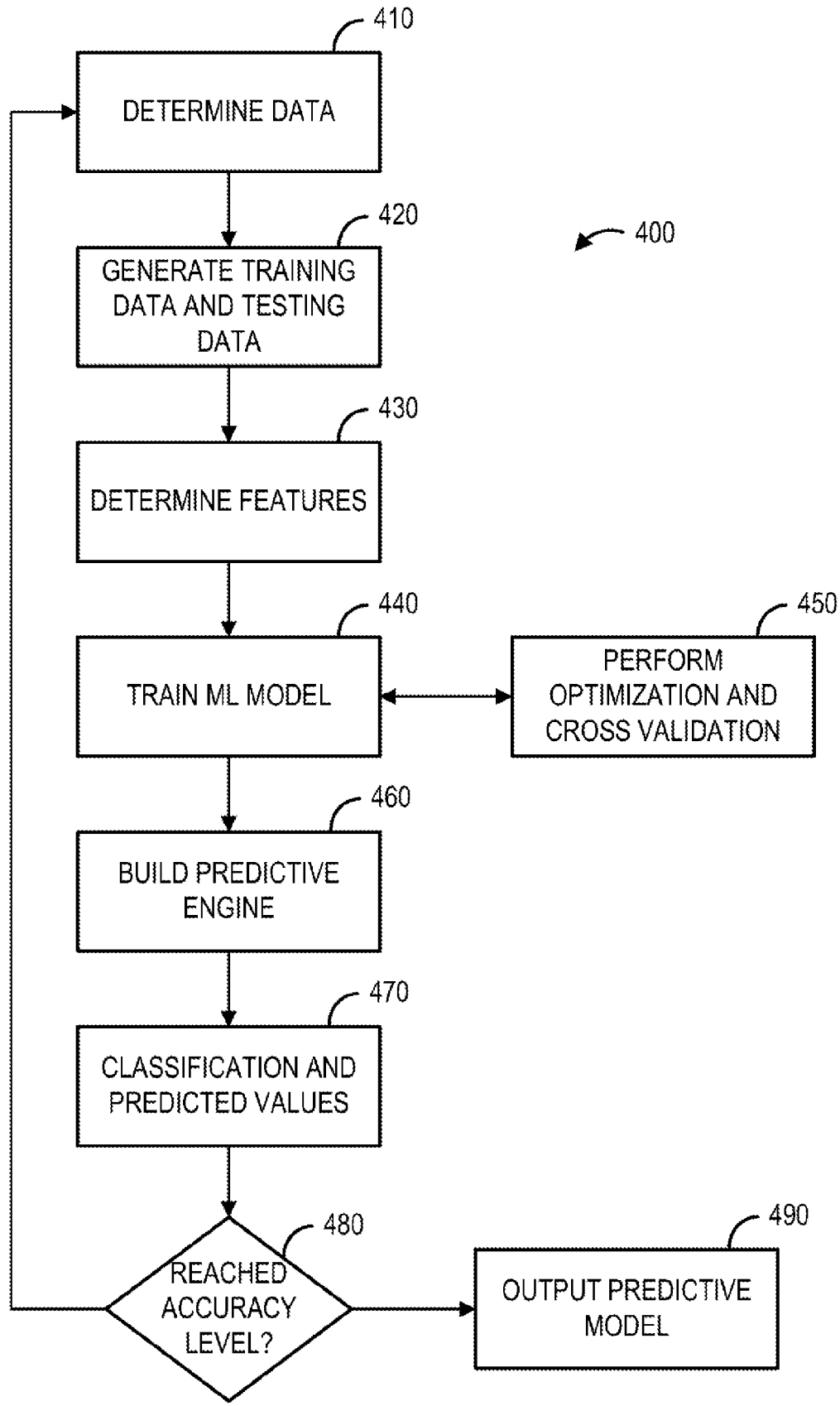
FIG. 4 shows a flowchart for an example method.

Turning now to FIG. 4, a flowchart illustrating an example training method 400 is shown. The method 400 may be used for generating the machine learning-based classifier 330 using the training module 320. The training module 320 can implement supervised, unsupervised, and/or semi-supervised (e.g., reinforcement based) machine learning-based classification models 340. The method 400 illustrated in FIG. 4 is an example of a supervised learning method; variations of this example of training method are discussed below, however, other training methods can be analogously implemented to train unsupervised and/or semi-supervised machine learning models.

The training method 400 may determine (e.g., access, receive, retrieve, etc.) first sample data associated with a plurality of core types (e.g., first material samples) and second sample data associated with the plurality of core types (e.g., second material samples) at step 410. The first sample data and the second sample data may each contain one or more imaging result datasets associated with material samples, and each imaging result dataset may be associated with a particular core type(s). Each imaging result dataset may include a labeled list of imaging results. The labels may comprise sufficient quality or insufficient quality.

The training method 400 may generate, at step 420, a training data set and a testing data set. The training data set and the testing data set may be generated by randomly assigning labeled imaging results from the second sample data to either the training data set or the testing data set. In some implementations, the assignment of labeled imaging results as training or test samples may not be completely random. In an embodiment, only the labeled imaging results for a specific core type and/or class may be used to generate the training data set and the testing data set. In an embodiment, a majority of the labeled imaging results for the specific core type and/or class may be used to generate the training data set. For example, 75% of the labeled imaging results for the specific core type and/or class may be used to generate the training data set and 25% may be used to generate the testing data set.

The training method 400 may determine (e.g., extract, select, etc.), at step 430, one or more features that can be used by, for example, a classifier to differentiate among different classifications (e.g., sufficient quality vs. insufficient quality). The one or more features may comprise a set of imaging result attributes. In an embodiment, the training method 400 may determine a set features from the first core date. In another embodiment, the training method 400 may determine a set of features from the second core date. In a further embodiment, a set of features may be determined from labeled imaging results from a core type and/or class different than the core type and/or class associated with the labeled imaging results of the training data set and the testing data set. In other words, labeled imaging results from the different core type and/or class may be used for feature determination, rather than for training a machine learning model. The training data set may be used in conjunction with the labeled imaging results from the different core type and/or class to determine the one or more features. The labeled imaging results from the different core type and/or class may be used to determine an initial set of features, which may be further reduced using the training data set.

The training method 400 may train one or more machine learning models using the one or more features at step 440. In one embodiment, the machine learning models may be trained using supervised learning. In another embodiment, other machine learning techniques may be employed, including unsupervised learning and semi-supervised. The machine learning models trained at 440 may be selected based on different criteria depending on the problem to be solved and/or data available in the training data set. For example, machine learning classifiers can suffer from different degrees of bias. Accordingly, more than one machine learning models can be trained at 440, optimized, improved, and cross-validated at step 450.

The training method 400 may select one or more machine learning models to build a predictive model at 460 (e.g., a machine learning classifier). The predictive model may be evaluated using the testing data set. The predictive model may analyze the testing data set and generate classification values and/or predicted values at step 470. Classification and/or prediction values may be evaluated at step 480 to determine whether such values have achieved a desired accuracy level. Performance of the predictive model may be evaluated in a number of ways based on a number of true positives, false positives, true negatives, and/or false negatives classifications of the imaging results indicated by the predictive model.

For example, the false positives of the predictive model may refer to a number of times the predictive model incorrectly classified an imaging result as having sufficient quality that in reality had insufficient quality. Conversely, the false negatives of the predictive model may refer to a number of times the machine learning model classified one or more imaging results as having insufficient quality when, in fact, the one or more imaging results had sufficient quality. True negatives and true positives may refer to a number of times the predictive model correctly classified one or more imaging results as having sufficient quality or insufficient quality. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model may be output at step 490; when the desired accuracy level is not reached, however, then a subsequent iteration of the training method 400 may be performed starting at step 410 with variations such as, for example, considering a larger collection of sample data.

Figure 5:
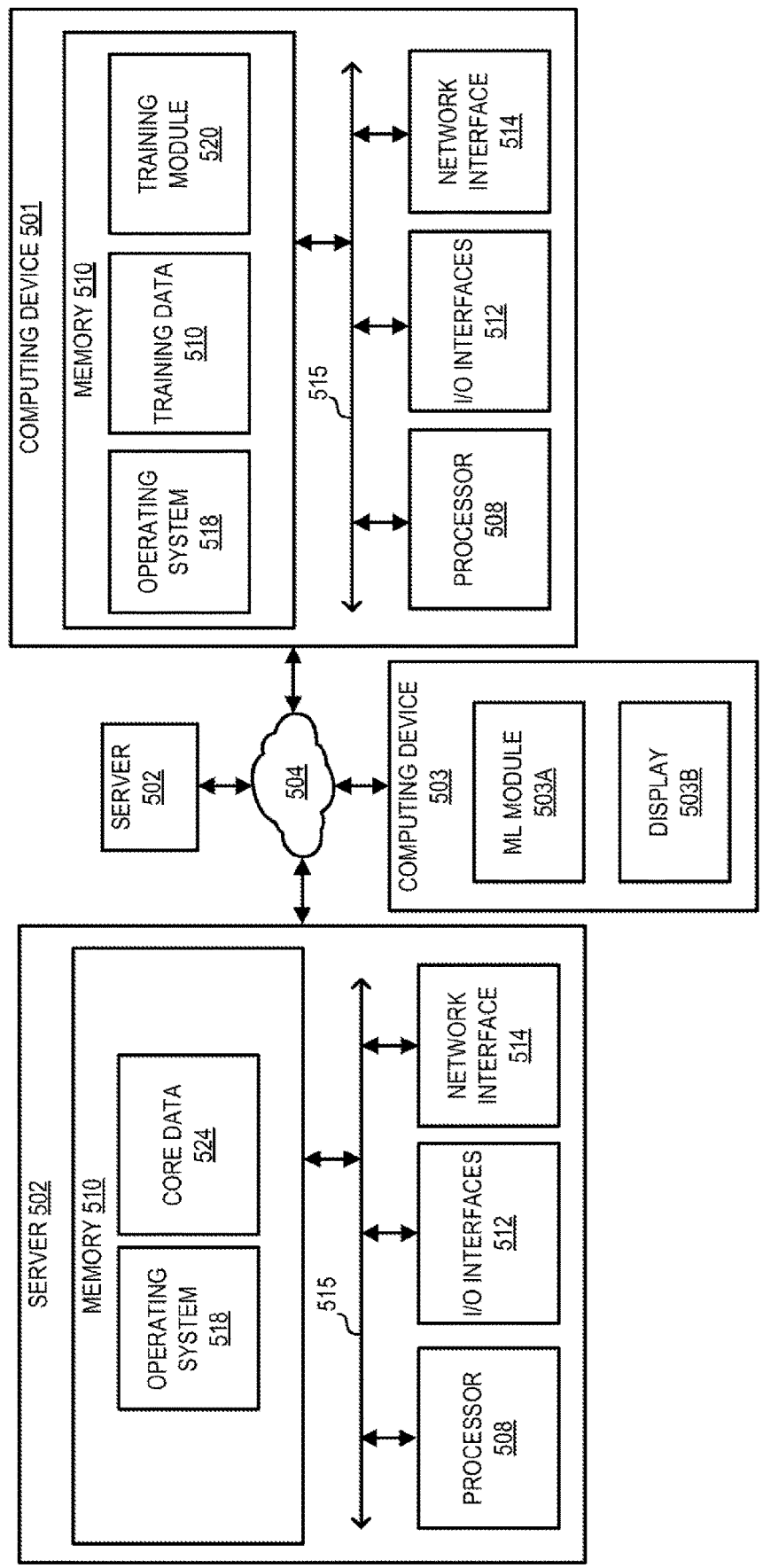
FIG. 5 shows an example system.

As discussed herein, the present methods and systems may be computer-implemented. FIG. 5 shows a block diagram depicting an environment 500 comprising non-limiting examples of a computing device 501 and a server 502 connected through a network 504. In an aspect, some or all steps of any described method may be performed on a computing device as described herein. The computing device 501 can comprise one or multiple computers configured to store one or more of the training module 520, training data 510 (e.g., labeled imaging results), and the like. The server 502 can comprise one or multiple computers configured to store sample data 524 (e.g., a plurality of imaging results). Multiple servers 502 can communicate with the computing device 501 via the through the network 504.

The computing device 501 and the server 502 can be a digital computer that, in terms of hardware architecture, generally includes a processor 508, memory system 510, input/output (I/O) interfaces 512, and network interfaces 514. These components (1508, 510, 512, and 514) are communicatively coupled via a local interface 516. The local interface 516 can be, for example, but not limited to, one or more buses or other wired or wireless connections, as is known in the art. The local interface 516 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 508 can be a hardware device for executing software, particularly that stored in memory system 510. The processor 508 can be any custom made or commercially available processor, a central processing unit (CPU), an auxiliary processor among several processors associated with the computing device 501 and the server 502, a semiconductor-based microprocessor (in the form of a microchip or chip set), or generally any device for executing software instructions. When the computing device 501 and/or the server 502 is in operation, the processor 508 can be configured to execute software stored within the memory system 510, to communicate data to and from the memory system 510, and to generally control operations of the computing device 501 and the server 502 pursuant to the software.

The I/O interfaces 512 can be used to receive user input from, and/or for providing system output to, one or more devices or components. User input can be provided via, for example, a keyboard and/or a mouse. System output can be provided via a display device and a printer (not shown). I/O interfaces 512 can include, for example, a serial port, a parallel port, a Small Computer System Interface (SCSI), an infrared (IR) interface, a radio frequency (RF) interface, and/or a universal serial bus (USB) interface.

The network interface 514 can be used to transmit and receive from the computing device 501 and/or the server 502 on the network 504. The network interface 514 may include, for example, a 5BaseT Ethernet Adaptor, a 50BaseT Ethernet Adaptor, a LAN PHY Ethernet Adaptor, a Token Ring Adaptor, a wireless network adapter (e.g., WiFi, cellular, satellite), or any other suitable network interface device. The network interface 514 may include address, control, and/or data connections to enable appropriate communications on the network 504.

The memory system 510 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 510 may incorporate electronic, magnetic, optical, and/or other types of storage media. Note that the memory system 510 can have a distributed architecture, where various components are situated remote from one another, but can be accessed by the processor 508.

The software in memory system 510 may include one or more software programs, each of which comprises an ordered listing of executable instructions for implementing logical functions. In the example of FIG. 5, the software in the memory system 510 of the computing device 501 can comprise the training module 320 (or subcomponents thereof), the training data 320, and a suitable operating system (O/S) 518. In the example of FIG. 5, the software in the memory system 510 of the server 502 can comprise, the sample data 524, and a suitable operating system (O/S) 518. The operating system 518 essentially controls the execution of other computer programs and provides scheduling, input-output control, file and data management, memory management, and communication control and related services.

The environment 500 may further comprise a computing device 503. The computing device 503 may be a computing device and/or system, such as an XRF system, at an excavation site. The computing device 503 may use a predictive model stored in a Machine Learning (ML) module 503A to classify an imaging result for a new material sample as having sufficient quality or insufficient quality. For example, the computing device 503 may receive new sample data comprising an imaging result for a new material sample, which may include one or more imaging result attributes. Using the new sample data and the predictive model stored in the ML module 503A, the computing device 503 may determine a probability. For example, the probability may be indicative of a level of confidence that the imaging result is of sufficient quality or insufficient quality.

For purposes of illustration, application programs and other executable program components such as the operating system 518 are illustrated herein as discrete blocks, although it is recognized that such programs and components can reside at various times in different storage components of the computing device 501 and/or the server 502. An implementation of the training module 320 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 6, a flowchart of an example method 600 for improved analysis of material samples (e.g., core and rock samples, etc.) and quality control is shown. The method 600 may be performed in whole or in part by a single computing device, a plurality of computing devices, and the like. At step 610, a computing device may receive sample data associated with a plurality of material samples. The sample data may be x-ray fluorescence (XRF) spectra data associated with the plurality of material samples. XRF spectra data for a sample may indicate one or more properties associated with the sample, such as one or elements present with the sample. At step 620, the computing device may determine a first subset of the plurality of material samples and a second subset of the plurality of material samples. For example, the computing device may determine the first subset based on a plurality of reference values and a plurality of analysis thresholds. The first subset may include samples associated with acceptable XRF spectra. As another example, the computing device may determine the second subset based on the plurality of reference values and the plurality of analysis thresholds. The second subset may include samples associated with unacceptable XRF spectra.

The plurality of reference values and the plurality of analysis thresholds may be associated with at least one sample of the plurality of material samples. Each reference value of the plurality of reference values may include a range of energy levels and a range of counts-per-second associated with a property of the one or more properties. The plurality of analysis thresholds may include one or more of a match percentage threshold, a property-specific threshold, or a counts-per-second threshold. The match percentage threshold may be based on the plurality of reference values. For example, match percentage threshold may define what percent of an XRF spectrum fits within the plurality of reference values. The property-specific threshold may be a percentage of Argon present within the at least one sample or a percentage of an anode material reflectance present within the at least one sample. The counts-per-second threshold may include a percentile value. For example, the counts-per-second threshold may be used to exclude samples associated with a spectrum having counts-per-second that fall below the selected percentile value.

The computing device may include a user interface. The user interface may be used to review and analyze data underlying the first subset and/or the second subset. At step 630, the computing device may provide an indication of the first subset and the second subset. For example, the user interface may be used to generate and manipulate charts, graphs, or other visual displays of the data underlying the first subset and/or the second subset. The user interface may also allow a user to manipulate the plurality of reference values and/or the plurality of analysis thresholds. The user interface may provide updated charts, graphs, or other visual displays of the data underlying the first subset and/or the second subset based on the user's manipulation (e.g., adjustment) of the plurality of reference values and/or the plurality of analysis thresholds.

Turning now to FIG. 7, a flowchart of an example method 700 for improved analysis of material samples (e.g., core and rock samples, etc.) and quality control is shown. The method 700 may be performed in whole or in part by a single computing device, a plurality of computing devices, and the like. At step 710, a computing device may receive first data associated with at least one set of samples of a plurality of material samples. The first sample data may comprise an x-ray fluorescence (XRF) spectrum associated with at least one sample. At step 720, the computing device may output a visualization. The visualization may comprise, or be indicative of, the XRF spectrum. For example, the visualization may be indicative of one or more properties present within the at least one sample, such as one or more elements, minerals, etc., based on the XRF spectrum. The computing device may provide the visualization, for example, as a chart, a graph, or another visual display of data underlying the least one sample.

At step 730, the computing device may receive a plurality of reference values associated with the one or more properties. Each reference value of the plurality of reference values may include a range of energy levels and a range of counts-per-second associated with a property of the one or more properties. At step 740, the computing device may receive a plurality of analysis thresholds associated with the plurality of material samples. The plurality of analysis thresholds may include one or more of a match percentage threshold, a property-specific threshold, or a counts-per-second threshold. The match percentage threshold may be based on the plurality of reference values. For example, match percentage threshold may define what percent of an XRF spectrum fits within the plurality of reference values. The property-specific threshold may be a percentage of Argon present within the at least one sample or a percentage of an anode material reflectance present within the at least one sample. The counts-per-second threshold may include a percentile value. For example, the counts-per-second threshold may be used to exclude samples associated with a spectrum having counts-per-second that fall below the selected percentile value.

At step 750, the computing device may store the plurality of reference values and the plurality of analysis thresholds. The stored plurality of reference values and the stored plurality of analysis thresholds may be used by the computing device to determine a first subset of the plurality of material samples and a second subset of the plurality of material samples. For example, the computing device may determine the first subset based on the plurality of reference values and the plurality of analysis thresholds. The first subset may include samples associated with acceptable XRF spectra (e.g., those that satisfy the plurality of reference values and the plurality of analysis thresholds). As another example, the computing device may determine the second subset based on the plurality of reference values and the plurality of analysis thresholds. The second subset may include samples associated with unacceptable XRF spectra (e.g., those that do not satisfy the plurality of reference values and the plurality of analysis thresholds).

Turning now to FIG. 8, a flowchart of an example method 800 for improved analysis of material (e.g., core or rock) samples and quality control is shown. The method 800 may be performed in whole or in part by a single computing device, a plurality of computing devices, and the like. For example, the training module 320 and/or the computing device 503 may be configured to perform the method 800.

At step 810, first sample data associated with a plurality of core types may be received and/or determined (e.g., selected) by a computing device. The plurality of core types may comprise a plurality of element compositions for a plurality of material samples. For example, each material sample may be composed of one or more elements and varying concentrations of each of the one or more elements. At step 820, second sample data associated with the plurality of core types may be received and/or determined (e.g., selected) by the computing device. The second sample data may include a plurality of material samples each labeled as having sufficient quality or insufficient quality. For example, each of the plurality of material samples may be associated with an imaging result, such as a result of an x-ray fluorescence (XRF) scan, and each imaging result may be labeled as having sufficient quality or insufficient quality.

Each imaging result may be visualized as an XRF energy spectrum. The XRF energy spectrum for a material sample may be indicative of a composition of the material sample, such as rock and/or mineral types present therein. The XRF energy spectrum for the material sample may include a plurality of energy peaks for specific rock and/or mineral types where element-specific fluorescent energies were detected. The higher the peak, the more counts of that particular energy were detected (e.g., the greater the intensity). For example, an intensity of a peak in the XRF energy spectrum may indicate the material sample consists of a certain amount of an element. In other words, an intensity of a peak may indicate a relative concentration of an element in the material sample.

At step 830, a plurality of features for a predictive model may be determined by the computing device. The predictive model may comprises one or more machine learning models. For example, the computing device may determine the plurality of features for the predictive model based on the first sample data and the second sample data. The plurality of features for the predictive model may comprise one or more of a level of intensity of an XRF spectrum peak, a level of energy of an XRF spectrum peak, an indication of a concentration of an element, or an indication of a presence of an element. In determining the plurality of features for the predictive model, the computing device may implement one or more steps of the method 400 described herein, such as step 430.

At step 840, the computing device may train the predictive model. For example the computing device may train the predictive model based on a first portion of the second sample data and the plurality of features. In training the predictive model, the computing device may implement one or more steps of the method 400 described herein, such as step 440. At step 850, the computing device may test the predictive model. For example, the computing device may test the predictive model based on a second portion of the second sample data to determine whether the predictive model accurately labels imaging results within the second portion of the second sample data as having sufficient quality or insufficient quality. At step 660, the computing device may output the predictive model (e.g., store the predictive model) or provide the predictive model to a second computing device.

Turning now to FIG. 9, a flowchart of an example method 900 for improved analysis of core or rock samples and quality control is shown. The method 900 may be performed in whole or in part by a single computing device, a plurality of computing devices, and the like. For example, the training module 320 and/or the computing device 503 may be configured to perform the method 900. The method 900 may be implemented using the predictive model generated and trained according to the method 800.

A computing device may use the predictive model to analyze new sample data associated with a new material sample. The computing device that performs the method 900 may be present at an excavation site. Alternatively, or in addition to, the computing device that performs the method 900 may be the same computing device that generated and trained the predictive model according to the method 600.

At step 910, the computing device may receive the new sample data associated with the new material sample. The new sample data may comprise an imaging result of the new material sample, such as a result of an XRF scan of the new material sample. At step 920, the new sample data may be provided to the predictive model (e.g., as input data). Using the predictive model, it may be determined at step 930 whether the imaging result of the new material sample is of sufficient or insufficient quality to indicate a composition of the new material sample, such as rock and/or mineral types present therein.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, at a computing device, sample data associated with a plurality of material samples, wherein the sample data comprises x-ray fluorescence (XRF) spectra associated with the plurality of material samples, wherein each XRF spectrum is indicative of one or more properties present within a sample of the plurality of material samples;
determining, based on a plurality of reference values and a plurality of analysis thresholds:
a first subset of the plurality of material samples associated with acceptable XRF spectra; and
a second subset of the plurality of material samples associated with unacceptable XRF spectra; and
providing, at a user interface, an indication of the first subset and the second subset.

2. The method of claim 1, wherein the plurality of reference values and the plurality of analysis thresholds are associated with at least one sample of the plurality of material samples.

3. The method of claim 1, wherein each reference value of the plurality of reference values comprises a range of energy levels and a range of counts-per-second associated with a property of the one or more properties.

4. The method of claim 1, wherein the plurality of analysis thresholds comprises a match percentage threshold, a property-specific threshold, a signal-to-noise threshold, and a counts-per-second threshold.

5. The method of claim 4, wherein the match percentage threshold is based on the plurality of reference values.

6. The method of claim 4, wherein at least one of:
the property-specific threshold comprises:
a percentage of Argon present within at least one sample of the plurality of material samples, or
a percentage of an anode material reflectance present within the at least one sample, or the signal-to-noise threshold comprises a variance and a mean of a selected portion of an XRF spectrum.

7. The method of claim 4, wherein the counts-per-second threshold comprises a percentile value.

8. A method comprising:
receiving first data associated with at least one sample of a plurality of material samples, wherein the first data comprises an x-ray fluorescence (XRF) spectrum associated with the at least one sample;
providing, at a user interface, the XRF spectrum, wherein the XRF spectrum is indicative of one or more properties present within the at least one sample;
receiving a plurality of reference values associated with the one or more properties;
receiving a plurality of analysis thresholds associated with the plurality of material samples; and
storing the plurality of reference values and the plurality of analysis thresholds.

9. The method of claim 8, wherein each reference value of the plurality of reference values comprises a range of energy levels and a range of counts-per-second associated with a property of the one or more properties.

10. The method of claim 8, wherein the plurality of analysis thresholds comprises a match percentage threshold, a property-specific threshold, a signal-to-noise threshold, and a counts-per-second threshold.

11. The method of claim 10, wherein the match percentage threshold is based on the plurality of reference values, and wherein the signal-to-noise threshold comprises a measure of variance present in a measurement of the at least one sample.

12. The method of claim 10, wherein the property-specific threshold comprises a percentage of Argon and/or anode material reflectance present within the at least one sample.

13. The method of claim 10, wherein the counts-per-second threshold comprises a percentile value.

14. The method of claim 8, further comprising
determining, based on the plurality of reference values and the plurality of analysis thresholds:
a first subset of the plurality of material samples associated with acceptable XRF spectra; and
a second subset of the plurality of material samples associated with unacceptable XRF spectra.

15. An apparatus comprising:
one or more processors; and
memory storing processor-executable instructions that, when executed by the one or more processors, cause the apparatus to:
receive first data associated with at least one sample of a plurality of material samples, wherein the first data comprises an x-ray fluorescence (XRF) spectrum associated with the at least one sample;
provide, at a user interface, the XRF spectrum, wherein the XRF spectrum is indicative of one or more properties present within the at least one sample;
receive a plurality of reference values associated with the one or more properties;
receive a plurality of analysis thresholds associated with the plurality of material samples; and
store the plurality of reference values and the plurality of analysis thresholds.

16. The apparatus of claim 15, wherein each reference value of the plurality of reference values comprises a range of energy levels and a range of counts-per-second associated with a property of the one or more properties.

17. The apparatus of claim 15, wherein the plurality of analysis thresholds comprises a match percentage threshold, a property-specific threshold, and a counts-per-second threshold.

18. The apparatus of claim 17, wherein the match percentage threshold is based on the plurality of reference values.

19. The apparatus of claim 17, wherein the property-specific threshold comprises a percentage of Argon present within the at least one sample or a percentage of an anode material reflectance present within the at least one sample.

20. The apparatus of claim 17, wherein the counts-per-second threshold comprises percentile value.

* * * * *